(12) United States Patent
Uchidate et al.

(10) Patent No.: US 9,818,050 B2
(45) Date of Patent: Nov. 14, 2017

(54) IMAGE FORMING APPARATUS THAT DETECTS OVERLAP OF COLOR MATERIAL, IMAGE PROCESSING APPARATUS AND IMAGE PROCESSING METHOD

(71) Applicant: CANON KABUSHIKI KAISHA, Tokyo (JP)

(72) Inventors: Hikaru Uchidate, Yokohama (JP); Yuuji Takayama, Yokohama (JP); Mahito Yoshioka, Numazu (JP); Masahide Hirai, Numazu (JP); Munehito Kurata, Boise, ID (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/615,808

(22) Filed: Feb. 6, 2015

(65) Prior Publication Data

US 2015/0227822 A1 Aug. 13, 2015

(30) Foreign Application Priority Data

Feb. 13, 2014 (JP) .................................. 2014-025924

(51) Int. Cl.
*G06K 15/12* (2006.01)
*G03G 15/00* (2006.01)

(52) U.S. Cl.
CPC ....... *G06K 15/129* (2013.01); *G03G 15/5041* (2013.01); *G03G 2215/0132* (2013.01)

(58) Field of Classification Search
None
See application file for complete search history.

(56) References Cited

U.S. PATENT DOCUMENTS

| 6,317,147 | B1 * | 11/2001 | Tanaka | H04N 1/506 |
| | | | | 347/116 |
| 8,095,022 | B2 * | 1/2012 | Fujishiro | G03G 15/0131 |
| | | | | 399/28 |
| 8,447,217 | B2 * | 5/2013 | Mori | 399/306 |
| 8,773,720 | B2 | 7/2014 | Uchidate et al. | |
| 8,804,194 | B2 | 8/2014 | Saito et al. | 358/1.9 |
| 2010/0067925 | A1 | 3/2010 | Mori | 399/15 |
| 2011/0286020 | A1 * | 11/2011 | Ishikawa et al. | 358/1.9 |

(Continued)

FOREIGN PATENT DOCUMENTS

| JP | 02-002583 | 1/1990 |
| JP | 2005-070136 | 3/2005 |
| JP | 2006-154413 A | 6/2006 |

(Continued)

*Primary Examiner* — Barbara Reinier
(74) *Attorney, Agent, or Firm* — Fitzpatrick, Cella, Harper & Scinto

(57) ABSTRACT

An image forming apparatus for forming an image on a recording material by a plurality of color materials, the apparatus includes: a determination unit configured to determine, based on converted data that are converted from image data corresponding to each image formed by the plurality of color materials, values each relating to an area of a respective color material caused to adhere to a recording material; and a detection unit configured to detect, based on the values each relating to the area of the respective color material that the determination unit determines, an overlapping of color materials.

23 Claims, 8 Drawing Sheets

(56) References Cited

U.S. PATENT DOCUMENTS

2013/0045021 A1* 2/2013 Yoshioka ........... G03G 15/2039
                                                        399/69
2013/0258367 A1* 10/2013 Saito ..................... G06K 15/14
                                                        358/1.9

FOREIGN PATENT DOCUMENTS

| JP | 2009-092688 A | 4/2009 |
| JP | 2010-048921   | 3/2010 |
| JP | 2010-072326   | 4/2010 |
| JP | 2011-013341 A | 1/2011 |
| JP | 2012-045796 A | 3/2012 |
| JP | 2013-205682   | 10/2013 |
| JP | 2013-254110   | 12/2013 |

* cited by examiner

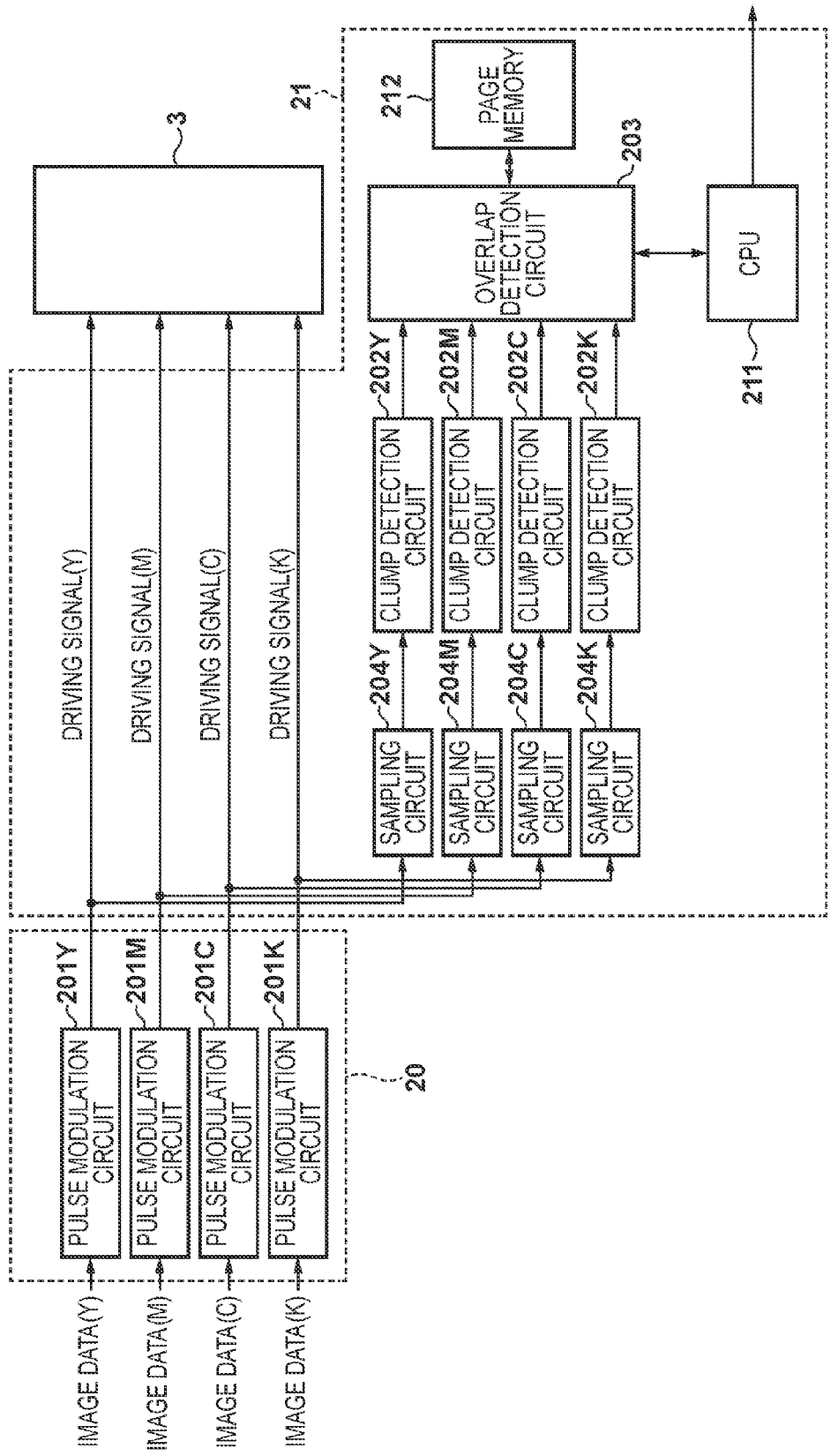

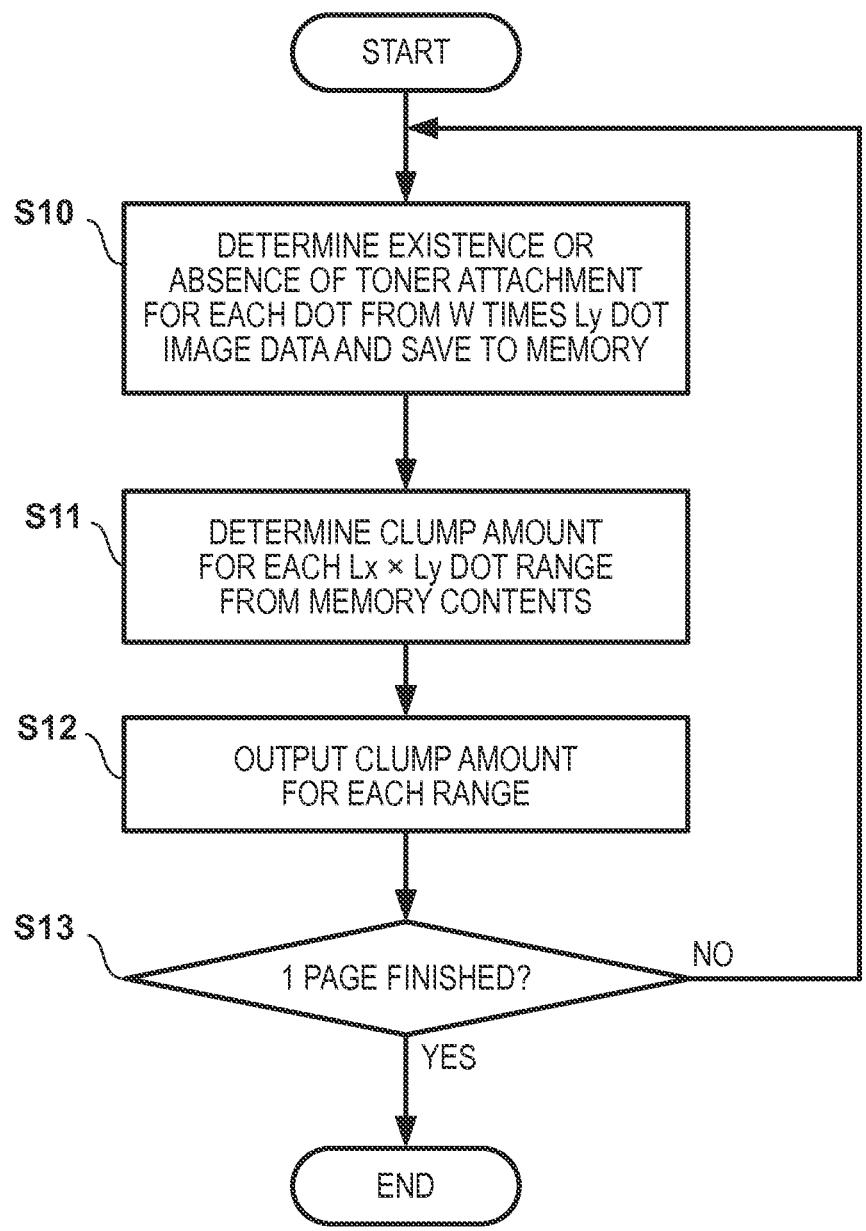

| REGION #1 | REGION #2 | REGION #3 | REGION #4 |
|---|---|---|---|
| C : 3<br>M : 3<br>Y : 0<br>K : 0 | C : 3<br>M : 3<br>Y : 0<br>K : 0 | C : 0<br>M : 3<br>Y : 0<br>K : 0 | C : 1<br>M : 1<br>Y : 0<br>K : 0 |

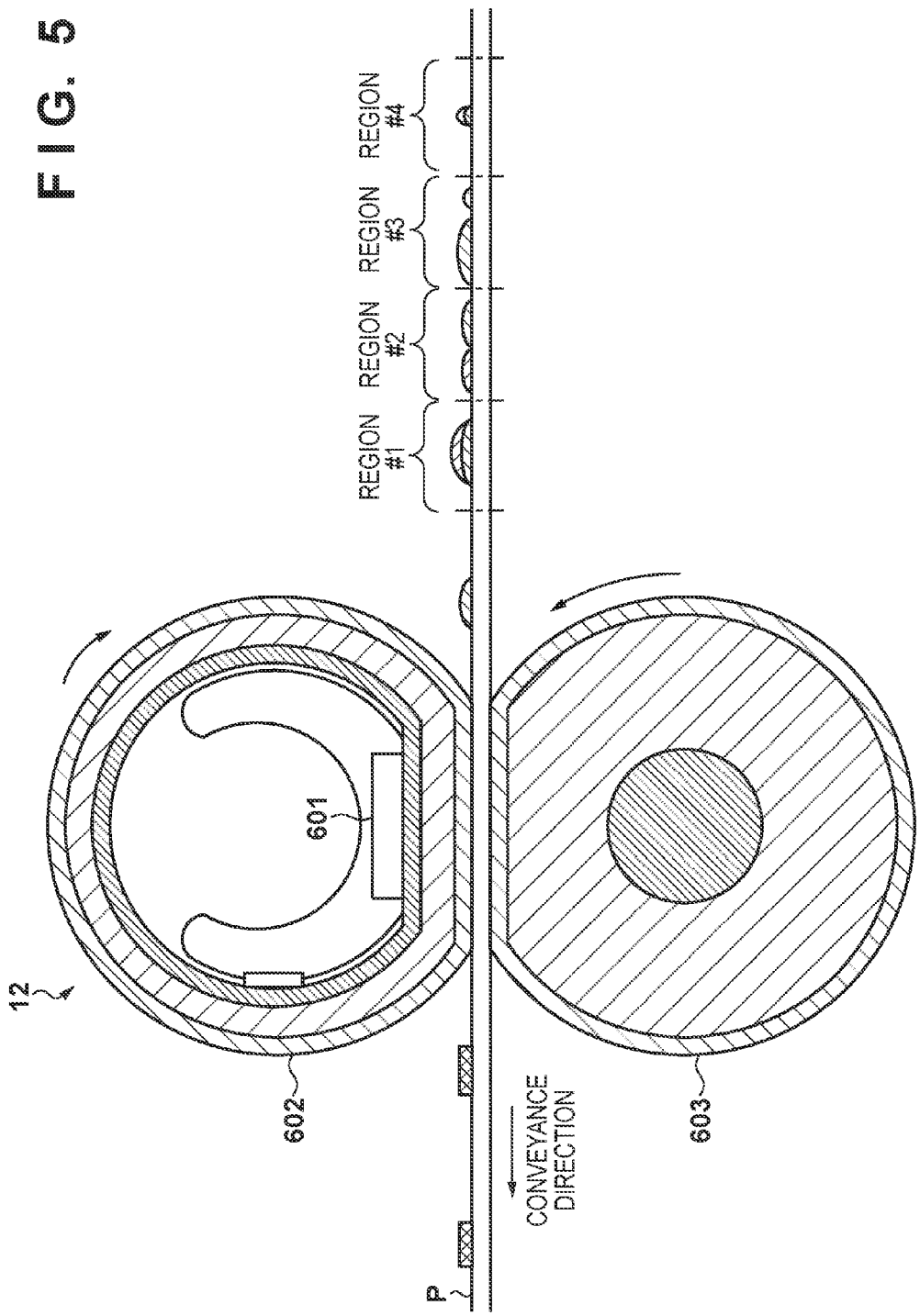

IMAGE FORMING APPARATUS THAT DETECTS OVERLAP OF COLOR MATERIAL, IMAGE PROCESSING APPARATUS AND IMAGE PROCESSING METHOD

BACKGROUND OF THE INVENTION

Field of the Invention

This disclosure relates to a technique of detecting an overlap of color materials when forming an image on a recording material by a plurality of color materials.

Description of the Related Art

Japanese Patent Laid-Open No. H02-002583 and Japanese Patent Laid-Open No. 2009-92688 disclose image forming apparatuses that, from image data of an image to be printed, estimate a state of overlapping of color materials used for image formation, and control image forming conditions in accordance with the estimated details.

Upon estimation of overlapping of color materials of an image from image data, it is necessary to store image data and data generated based on the image data. In general, it is better that a capacity (size) of a storage unit, such as a memory that is allocated in order to store such data, be smaller, and for this the amount of data that is stored may be reduced.

SUMMARY OF THE INVENTION

According to an aspect of the present invention, an image forming apparatus for forming an image on a recording material by a plurality of color materials includes: a determination unit configured to determine, based on converted data that are converted from image data corresponding to each image formed by the plurality of color materials, values each relating to an area of a respective color material caused to adhere to a recording material; and a detection unit configured to detect, based on the values each relating to the area of the respective color material that the determination unit determines, an overlapping of color materials.

Further features of the present invention will become apparent from the following description of exemplary embodiments with reference to the attached drawings.

BRIEF DESCRIPTION OF THE DRAWINGS

FIG. 2A and FIG. 2B are views for showing a control configuration of the image forming apparatus according to an embodiment.

FIG. 3 is a flowchart for clump detection processing according to an embodiment.

FIG. 5 is an overview configuration diagram of a fixing unit according to an embodiment.

DESCRIPTION OF THE EMBODIMENTS

Exemplary embodiments of the present invention will be described hereinafter with reference to the drawings. Note that the following embodiments are only examples, and the present invention is not limited to the content of the embodiments. Also, for the following drawings, elements that are not necessary in the explanation of the embodiment are omitted from the drawings.

First Embodiment

Figure 1:
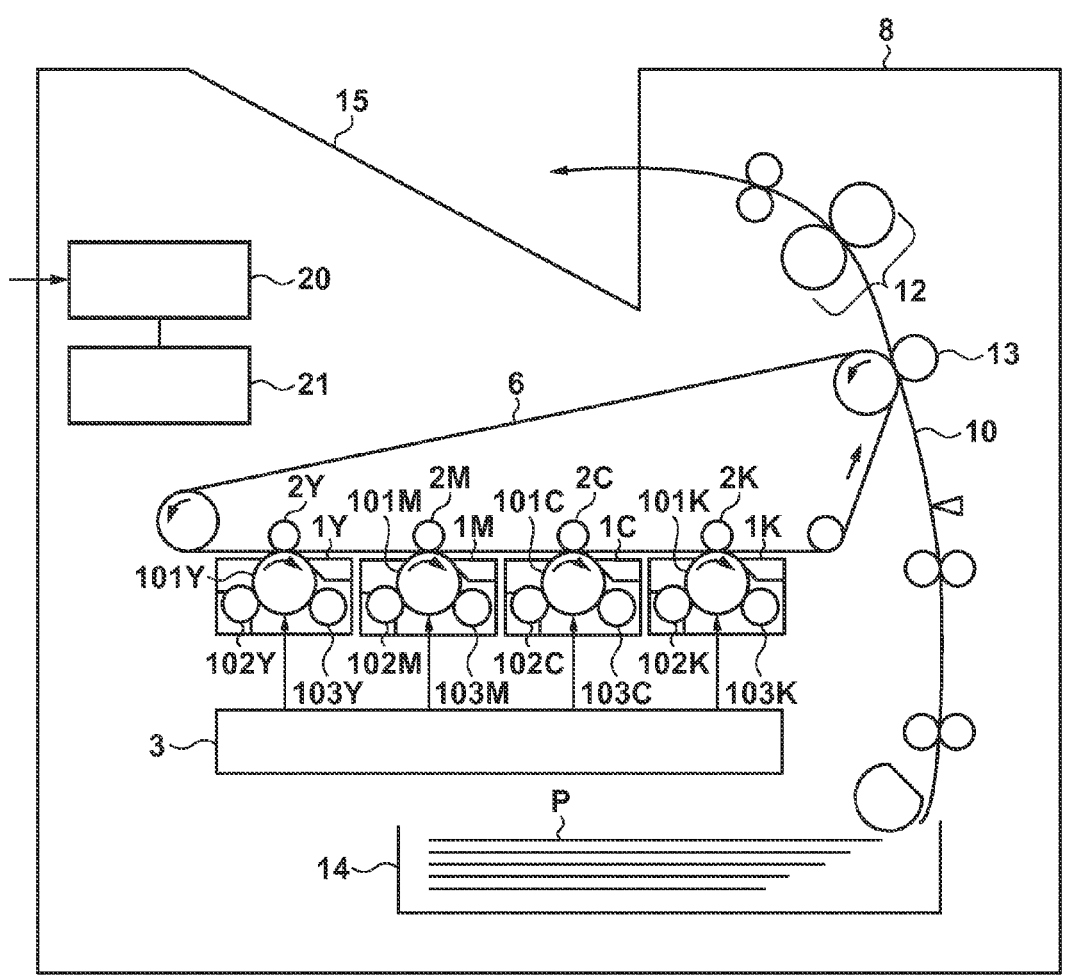
FIG. 1 is an overview configuration diagram of an image forming apparatus according to an embodiment.

FIG. 1 is an overview configuration diagram of an image forming apparatus 8 according to this embodiment. The image forming apparatus of the present embodiment forms a full color image by overlaying toner images formed by toners (color materials) of four colors: yellow, cyan, magenta, and black. In FIG. 1, Y, M, C and K added on the end of reference numerals indicate that a corresponding component is something that corresponds to formation of a yellow, cyan, magenta, and black toner image respectively. Note that in the following explanation, in a case where it is not necessary to distinguish the color of the toner, the reference numeral is used with the alphabet suffix on the end removed. An image forming station 1 includes a photosensitive member 101 that is rotationally driven, a charging unit 103 that charges to a uniform potential a surface of the photosensitive member 101, and a developing unit 102 that makes visible a toner image by supplying toner to an electrostatic latent image formed on the surface of the photosensitive member 101. Note, the electrostatic latent image of each photosensitive member 101 is formed by an exposure unit 3, for each color, scanning with light the surface of the corresponding photosensitive member 101 based on image data. A primary transfer roller 2, for each color, transfers to an intermediate transfer belt 6, which is an image carrying member that is rotationally driven, a toner image formed on a corresponding photosensitive member 101 by outputting a primary transfer bias. Note, a full color image is formed by controlling a transfer timing so as to transfer overlapping each of the toner images formed on the photosensitive member 101 to the intermediate transfer belt 6.

A toner image transferred to the intermediate transfer belt 6 is conveyed to an opposing position of a secondary transfer roller 13 by a rotation of the intermediate transfer belt 6. A recording material P stored in a cassette 14 is conveyed to a nip area of the intermediate transfer belt 6 and the secondary transfer roller 13 by a roller arranged along a conveyance path 10. The secondary transfer roller 13, by outputting a secondary transfer bias, transfers the toner image of the intermediate transfer belt 6 to the recording material. The recording material P to which the toner image is transferred is heated and pressurized in a fixing unit 12, and after the fixing of the toner image is performed, the recording material P is discharged to a discharge tray 15.

A video controller 20 receives, from an external apparatus such as a host computer (not shown), image data to form on the recording material P, and performs predetermined processing such as color conversion processing, halftoning processing, or the like, on the image data. This processed image data are converted into a driving signal in order to drive the exposure unit 3 and outputted to a control unit 21. The control unit 21 performs image formation control by transmitting the driving signal to the exposure unit 3, and controlling each unit shown in FIG. 1.

Figure 2A:
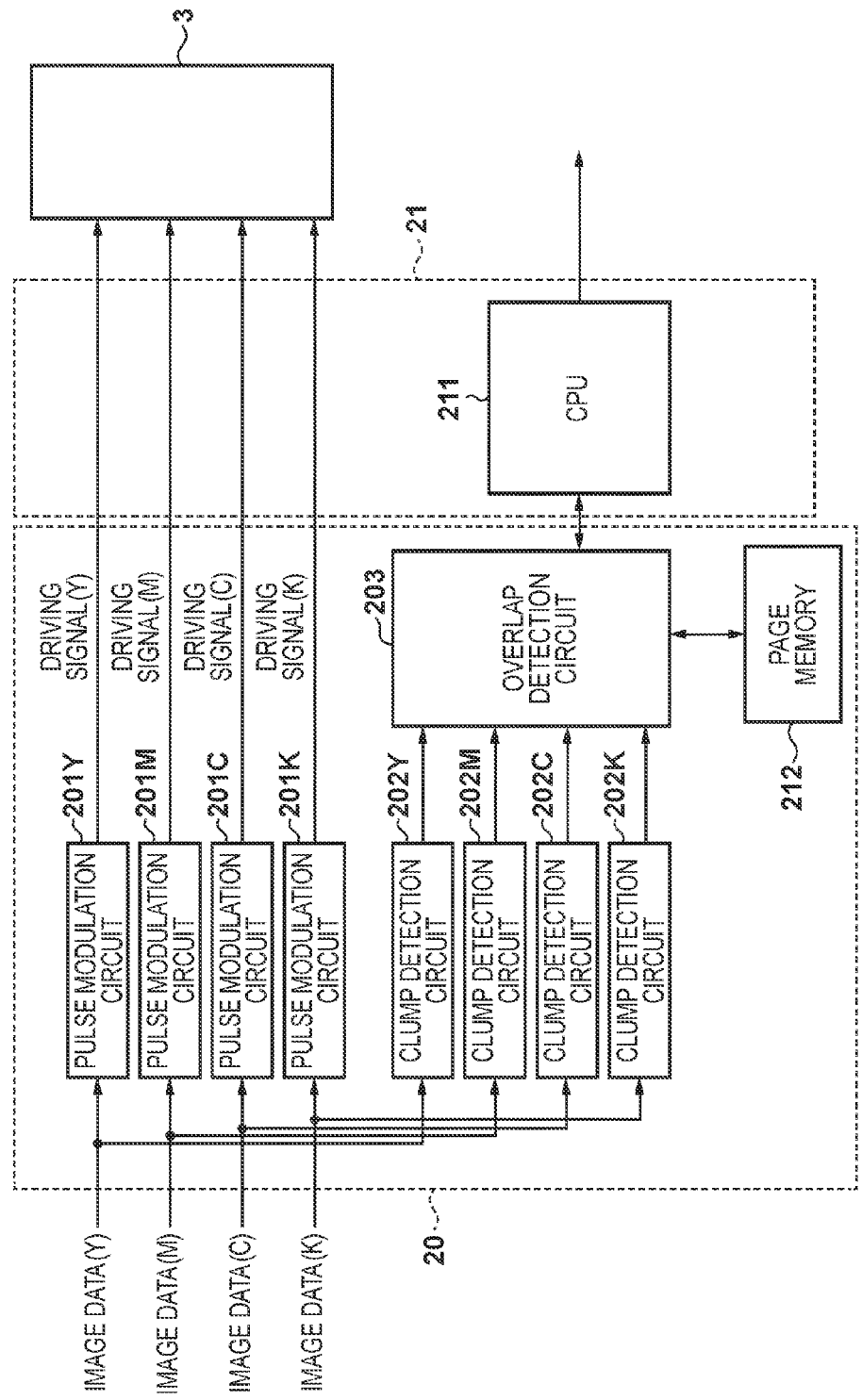

FIG. 2A is a configuration diagram of the video controller 20 and the control unit 21 according to the present embodiment. As previously explained, the video controller 20, when image data are received in a raster sequence from an external apparatus (not shown), performs predetermined image processing, such as for example color conversion processing, halftoning processing, or the like, on the received image data. Note, functional blocks indicating processing that is not related directly to the explanation of the present embodiment, such as those for color conversion processing, halftoning processing, or the like, are omitted in FIG. 2A. Image data for each color to which the predetermined processing is applied is converted into a driving signal in order to drive the exposure unit 3 by a pulse modulation circuit 201, and is outputted to the exposure unit 3 via the control unit 21. Also, image data of each color is output to a clump detection circuit 202, and in the clump detection circuit 202, a value relating to a size of a clump of toner (a value relating to an area) is determined. Output of each clump detection circuit 202 is output to an overlap detection circuit 203, and the overlap detection circuit 203, based on output from the clump detection circuit 202, stores the data in a page memory 212. The overlap detection circuit 203, from data stored in the page memory 212, detects a degree of overlapping of toner of each color in each region, converts into a numeric value this degree, and outputs it to the CPU 211. The CPU 211 controls image forming conditions in accordance with the degree of overlapping of the toner image, for example.

Firstly, explanation will be given for processing in the clump detection circuit 202. The clump detection circuit 202, from image data for forming an image by toner of each color input from an external host computer, or the like, counts a number of dots (number of pixels) for which toner is caused to adhere for each predetermined range. Note, in the present embodiment, the predetermined range is set to be a rectangular range of $Lx \times Ly$ dots (pixels). The clump detection circuit 202 outputs a count value for each range as a clump amount indicating an area of a clump of toner. Note, in the explanation following, it is assumed that image data of one dot is d bits, and sizes in a main scanning direction and a sub-scanning direction of a formation target image are W and H dots. Also, the clump detection circuit 202 is provided with a memory for $W \times Ly$ dots where one dot corresponds to one bit, i.e. a memory of $W \times Ly \times$ one bit. This memory is a storage unit for storing data indicating whether or not a toner adheres for dots on a predetermined number of lines in the main scanning direction, Ly lines in the present example.

Continuing on, explanation will be given for operation of the clump detection circuit 202 using a flowchart of FIG. 3. The clump detection circuit 202, in step S10, reads in image data for the first $W \times Ly$ dots of image data. Then, in the present example, in a case where toner adheres for a dot or in a case where toner does not adhere for a dot, respectively a "1" or a "0" are caused to be stored for a corresponding position of the above described memory for the $W \times Ly$ dots. The clump detection circuit 202, in step S11, from the data stored in the memory for the $W \times Ly$ dots, in units of ranges of $Lx \times Ly$ dots, counts the number of dots for which toner is adhered in each range, and sets these count values to be the clump amounts for the ranges. Note, because the size of the memory is for $W \times Ly$ dots, there exists W/Lx ranges of $Lx \times Ly$ dots. Note, in the present example, it is assumed that W is an integer multiple of Lx, but when that is not the case, the length in the main scanning direction of the last range is less than Lx. The clump detection circuit 202, in step S12, outputs a clump amount for each range to the overlap detection circuit 203. After that, in step S13, the clump detection circuit 202 determines whether image data for one page has been processed, and in a case where it has not been processed, repeats the processing from step S10 for the next $W \times Ly$ dots of image data.

Continuing on, explanation will be given for processing in the overlap detection circuit 203. Note, in the present embodiment, the image to be formed is divided into a plurality of regions of a predetermined size, and detection of overlapping of toner is performed for each region. Below it is assumed that the size of a region is $Rx \times Ry$ dots. Note that Lx<Rx and Ly<Ry. However, it is possible to configure so that Lx=Rx and Ly=Ry. For example, it is possible to determine each value such that Lx is Rx times an integer factor of 1, and Ly is Ry times an integer factor of 1. The page memory 212 of FIG. 2A is a memory having a capacity for storing r bits of data for each color for each region. In other words, the page memory 212 is of a size of $Q \times r \times 4$ bits where Q is the number of regions. Note, the number of regions is a product of a number (W/Rx) with everything below the decimal point rounded up, and a number (H/Ry) with everything below the decimal point rounded up. Because it is assumed that the area of a region is fixed, Rx and Ry can be determined such that (W/Rx) and (H/Ry) become integers. In the following explanation, r=2 bits. Also, it is assumed that the value of $Lx \times Ly$ is larger than a maximum value 3 that can be expressed in 2 bits.

The overlap detection circuit 203 stores a clump amount that the clump detection circuit 202 corresponding to each color outputs into a storage position of a corresponding region of the page memory 212. Note, because the maximum value of the clump amount is $Lx \times Ly$, and this is larger than the maximum value 3 that can be expressed in 2 bits, the overlap detection circuit 203 quantizes a clump amount into 2 bits by a predetermined quantization step and stores the result in the page memory 212. Note, because Lx<Rx and Ly<Ry, a plurality of ranges for which clumps are detected exist in one region. In this embodiment, the overlap detection circuit 203 quantizes a maximum value of these and stores the result in the page memory 212. However, it is possible to use an average value, or the like.

Figures 4A, 4B:
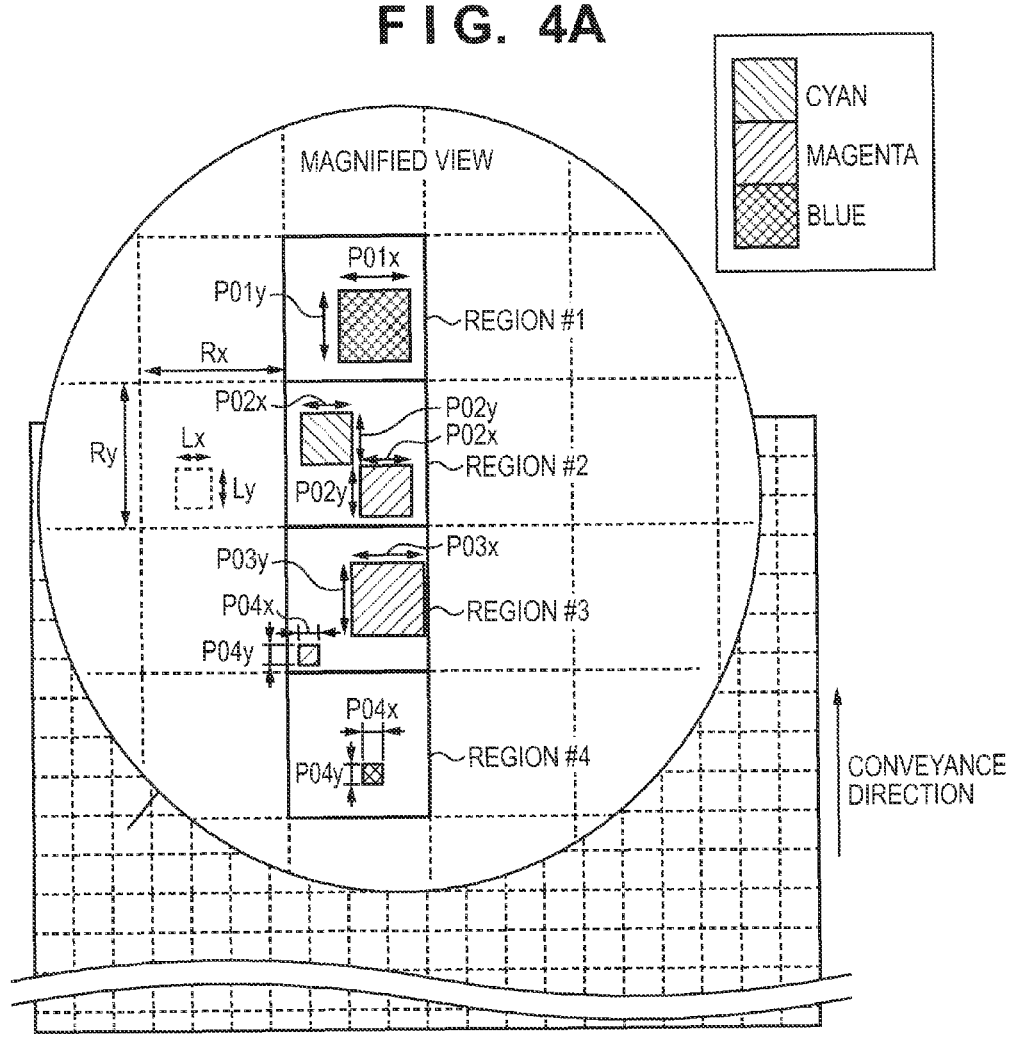
FIG. 4A and FIG. 4B are explanatory views for processing in an overlap detection circuit according to an embodiment.

FIG. 4A and FIG. 4B are explanatory views for processing in the overlap detection circuit 203. FIG. 4A indicates an image that is formed, and a conveyance direction indicated by an arrow symbol corresponds to the sub-scanning direction. Also, a direction perpendicular to the conveyance direction indicated by the arrow symbol corresponds to the main scanning direction. Note, a region of a rectangle indicated by dashed lines in FIG. 4A indicates a region of a size of $Rx \times Ry$ dots. In FIG. 4A, in a region #1, a clump of a toner image that is blue (cyan+magenta) of $P01x \times P01y$ dots is formed. Here, it is assumed that P01x>Lx and P01y>Ly. In such a case, for both the clump detection circuit 202C for cyan and the clump detection circuit 202M for magenta, a maximum value $Lx \times Ly$ is output as a clump amount. Then, the overlap detection circuit 203, as is shown in FIG. 4B, stores the maximum value 3 represented by 2 bits for cyan and magenta in a storage position corresponding to the region #1 in the page memory 212.

Also, in a region #2 of FIG. 4A, clumps of a toner image of cyan and magenta of $P02x \times P02y$ dots are respectively formed. Here, it is assumed that P02x>Lx and P02y>Ly. Accordingly, similarly to the region #1, as is shown in FIG. 4B, cyan (C)=3 and magenta (M)=3 are stored in a storage position corresponding to the region #2 in the page memory 212. Also, in an region #3 of FIG. 4A, two clumps of magenta toner image of $P03x \times P03y$ dots and $P04x \times P04y$ dots are formed. Here, it is assumed P03x>Lx>P04x and P03y>Ly>P04y. As with the region #3, in a case where there is a plurality of toner image clumps that are the same color, in this embodiment, the maximum value of these is stored. In other words, magenta=3 is stored in a storage position corresponding to the region #3 in the page memory 212. Furthermore, in an region #4, a blue toner image clump of P04x×P04y dots is formed. Here, it is assumed that Lx>P04x and Ly>P04y. In the present example, by quantization into 2 bits, cyan=1 and magenta=1 are each stored at a storage position corresponding to the region #4 in the page memory 212.

The overlap detection circuit 203, from values of each color of each region of the page memory 212 determines an overlapping of toner in each region. As an example, it is determined that there is toner overlapping for a region in which a plurality of colors for which the value is not zero exist. In other words, for a region in which a plurality of colors for which the clump amount after quantization is not zero exist, it is determined that there is an overlapping of toner. In such a case, in the state of FIG. 4B, it is determined that there is overlapping for the regions #1, #2, and #4. However, in the region #2, as is shown in FIG. 4A, the cyan and the magenta are actually not overlapping. This is an example of an incorrect detection. A probability of occurrence of an incorrect detection is dependent upon the size of the Rx×Ry dot region and the size of the Lx×Ly dot range at which the clumps are detected. In other words, the smaller the sizes of the regions than the range at which the clumps are detected, the higher the probability of occurrence of an incorrect detection becomes. Accordingly, the size of the regions and the size of the range at which the clumps are detected are determined by a permitted probability of occurrence of an incorrect detection.

Note, configuration may be taken such that, for a region for which a plurality of colors for which the clump value after quantization is not zero exist and the value for at least one of the colors is greater than or equal to a threshold, it is determined that there is an overlapping of toner. Furthermore, configuration may be taken such that it is determined that there is overlapping of toner in a region for which at least two colors for which the clump value after quantization is greater than or equal to a threshold exist.

Explanation will be given for an advantage of the present embodiment below. Note, a size of a 1 page image is W×H dots, and image data is d bits for each 1 dot for each color. Also, a formation timing difference between the photosensitive member 101 Y, the photosensitive member 101 M, and the photosensitive member 101 C, with the photosensitive member 101 K that finally forms an electrostatic latent image, as shown in FIG. 1, are respectively made to be D_YK, D_MK and D_CK dots by a dot conversion. An explanation will be given for a case in which, in a conventional image forming apparatus, an overlapping of area Lx×Ly is detected. For yellow, to detect an overlap with black, which has the largest delay difference, a memory having a dot amount of D_YK is required. Additionally, since it is necessary to detect an overlap for a size of Lx×Ly dots, it is necessary that the capacity of the memory be a value to which an additional Ly dots are added. In other words, the required memory size Mem(Y) for image data for yellow is as follows.

$$Mem(Y) = (D\_YK + Ly) \times d \text{ (bits)}$$

Similarly, the memory size Mem(M) required to detect an overlap for magenta and black, and the memory size Mem (C) required to detect an overlap for cyan and black are as follows.

$$Mem(M) = W \times (D\_MK + Ly) \times d \text{ (bits)}$$

$$Mem(C) = W \times (D\_CK + Ly) \times d \text{ (bits)}$$

Additionally, the memory size Mem(K) required to detect an overlap between black image data and other colors is as follows.

$$Mem(K) = W \times Ly \times d \text{ (bits)}$$

From the above, a memory size Mem (O) that is required for holding image data as is and detecting an overlap of toner image is:

$$Mem(O) = Mem(Y) + Mem(M) + Mem(C) + Mem(K)$$
$$= W \times (D\_YK + D\_MK + D\_CK + 4Ly) \times d \text{(bits)}$$

On the other hand, in the present embodiment, a size of a memory that each clump detection circuit 202 has is each W×Ly×1-bit. Additionally, the page memory 212 for an overlap detection circuit 203 is (W/Rx)×(H/Ry)×r[bit] for each color. Therefore, the memory size Mem(N) required for the present embodiment is:

$$Mem(N) = 4 \times W \times Ly + (W/Rx) \times (H/Ry) \times r \times 4 \text{ (bits)}$$

Here, explanation will be given for an effect of reducing memory by matching a realistic numeric value for each variable. The above described variables are assumed to be the following values:
W=5000
H=8000
D_YK=6000
D_MK=4000
D_CK=2000
d=8
Lx=Ly=16
Rx=Ry=64
r=2

Substituting the above values into the equations, the results are:
Mem(O)=482, 560, 000 (bits)
Mem(N)=398, 125 (bits) In the case of the above conditions, approximately 0.08% of memory size is needed to be able to detect toner overlap compared to the conventional art.

Thereafter, from image data, a value that represents an area of each of the clumps of a toner that adheres to a recording material is output, and for each region of a plurality of regions into which the image is divided, an overlap of toner is detected based on a value that represents an area of a clump for each color material. By this configuration, the memory capacity required to detect an overlap can be reduced. Note, in the present embodiment explanation was given for a method of detecting an overlap of toner, for each region of a plurality of regions into which a formed image is divided, but limitation is not made to this. For example, it is also possible to detect an overlap of toner by treating the entire formed image as one region.

Additionally, in this embodiment, configuration is taken in which the clump detection circuit 202 and the overlap detection circuit 203 are arranged on the video controller 20, however the present invention is not limited to this kind of configuration. For example, as shown in FIG. 2B, a configuration can be taken in which the clump detection circuit 202 and the overlap detection circuit 203 are arranged on the control unit 21. Additionally, as shown in FIG. 2B, the clump detection circuit 202 can determine a size of a clump from a driving signal that each pulse modulation circuit 201 outputs. Since a driving signal is a pulse modulated signal, an operation equivalent to that of the configuration of FIG.

2A can be realized by installing a sampling circuit 204 for sampling for each dot. Additionally, in this embodiment, the clump detection circuit 202 outputs a count value for dots to which a toner adheres for every Lx×Ly range, and the overlap detection circuit 203 quantizes the count value and holds the result in the page memory 212. However, a configuration may be taken where, in the clump detection circuit 202, a count value for dots to which toner adheres is quantized, and the value after quantization is output as a value representing the area of the toner clump to the overlap detection circuit 203.

Also, in this embodiment, an image forming apparatus determines an overlap of a color material. However, an image processing method for determining overlap of color material as explained in the present embodiment, is executed by an image processing apparatus, rather than the image forming apparatus, can also be configured.

Second Embodiment

In this embodiment, a fixing temperature is controlled as an image forming condition based on the overlapping detection result explained in the first embodiment. FIG. 5 is a cross sectional view of a fixing unit 12 according to an embodiment. The fixing unit 12 according to FIG. 5 includes a ceramic heater 601 for heating, a fixing film 602 and a pressure roller 603. The ceramic heater 601, the fixing film 602 and the pressure roller 603 all have an elongated component in the main scanning direction. By causing the ceramic heater 601 to generate heat, the circumference surface (surface) of the fixing film 602 is heated and a predetermined fixing temperature T is maintained. The pressure roller 603 contacts with the fixing film 602 so as to apply pressure on the surface of the fixing film 602 through a pressurization spring, or the like.

As has already been described, the toner image that was transferred to the recording material P is heated and pressurized by the fixing unit 12, and because of this the toner image is fixed on the recording material P. At this time, in the case that a heat of the surface of the fixing film 602 is not sufficient, the toner image is not fixed to the recording material P, and is discharged to the discharge tray 15 in an unfixed state. Also, in the case that the heat on the surface of the fixing film 602 is excessive, the toner image may adhere to the fixing film 602 without fixing to the recording material P (hot offset). In other words, in order to obtain a good print image, a fixing temperature T must be optimally set.

Figure 6:
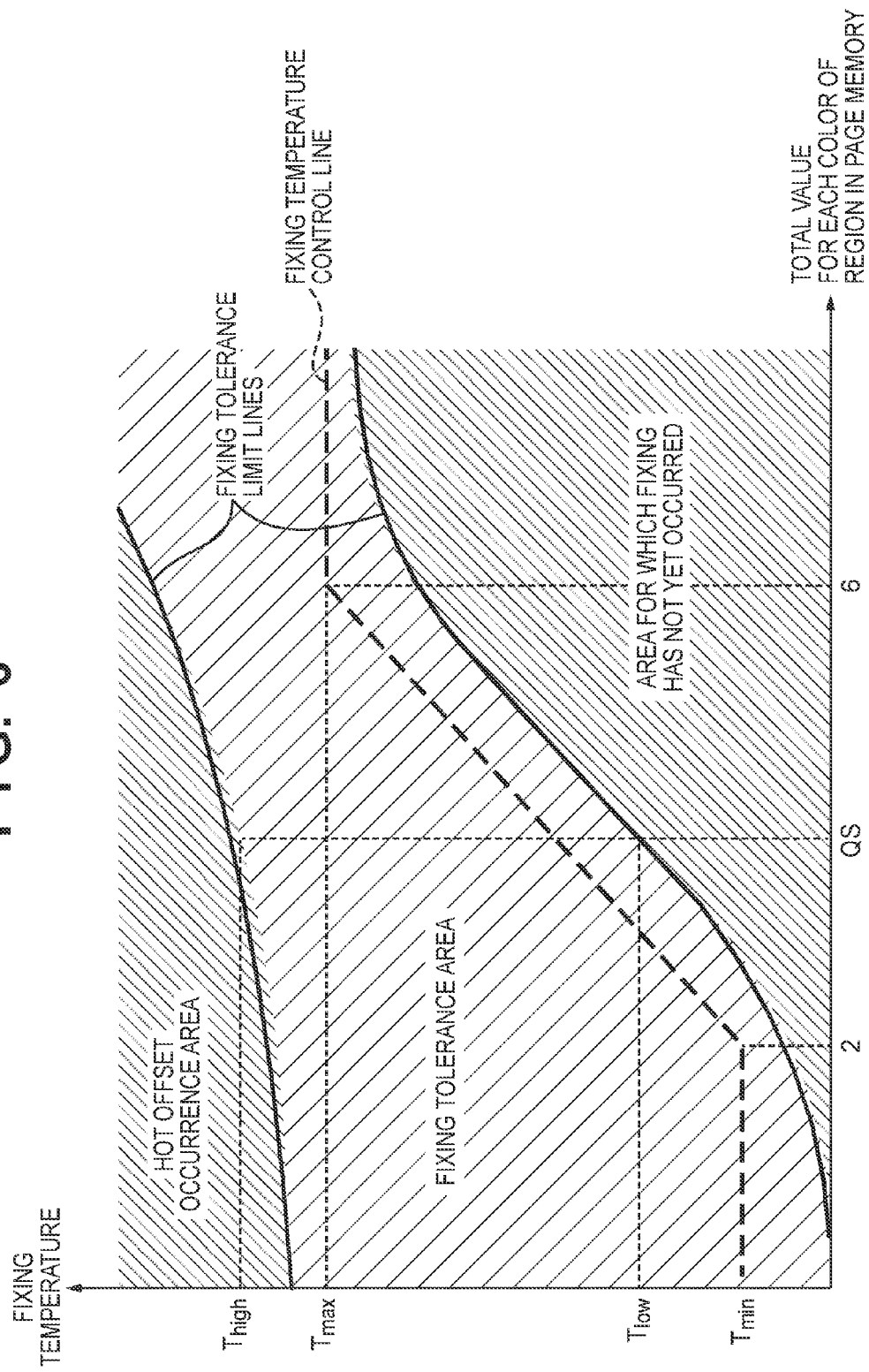
FIG. 6 is an explanatory view of fixing temperature control according to an embodiment.

FIG. 6 is a graph showing a relationship between a toner amount and a fixing temperature. The graph in FIG. 6, is a graph wherein the ordinate axis is a fixing temperature, the abscissa axis is the total value of values for each color of a region that the page memory 212 stores. The value for each color of a region represents a degree of size for a clump (area) of dots as explained in the first embodiment. The larger the total value of a value for each color of a region, the larger the toner amount that is adhered for that region. For FIG. 6, the solid lines are fixing tolerance limit lines, and these show limits where if not within the fixing tolerance limit lines, a defective fixing image will occur.

For example, when the total value for each color of a region is QS, the range of fixing temperatures permitted for this region is between $T_{low}$ and $T_{high}$. In other words, when the fixing temperature T is a temperature lower than $T_{low}$, an unfixed image occurs due to insufficient heat, and when the fixing temperature T is a temperature higher than $T_{high}$, then defective fixing occurs due to a hot offset that occurs due to excessive heat. The fixing temperature is decided so as to minimize the electric power for fixing, without generating defective fixing. For the present embodiment, the fixing temperature set by the image forming apparatus 8 is shown as a fixing temperature control line with a dotted line in FIG. 6. For this fixing temperature control line, in the case that a total value for each color is less than or equal to 2, the fixing temperature is $T_{min}$, in the case that the total value is greater than or equal to 6, the fixing temperature is $T_{max}$, and in the case that the total value is 2-6, the fixing temperature is on a straight line that linearly connects $T_{min}$ and $T_{max}$. FIG. 6 is only one example of the fixing temperature control line, and as long as the fixing temperature is controlled so as to fit into a fixing tolerance area, it is not limited to this.

For example, if in the state shown in FIG. 4B, since the total value for the region #1 and the region #2 is 6, control is performed such that fixing is performed at the fixing temperature $T_{max}$ for the region #1 and the region #2. Also, for the region #3, since the total value is 3, the fixing temperature, according to the graph in FIG. 6, would be $T=(T_{max}+3T_{min})/4$. The total value of the region #4 is 2, therefore the fixing temperature $T=T_{min}$.

As has been described above, by controlling a fixing temperature by a total value that represents sizes of areas of clumps, an occurrence of a defective fixing can be suppressed. Also, in this embodiment, a fixing temperature for each region is changed, however a configuration may be taken where a fixing temperature is controlled for each of a plurality of regions by a minimum, a maximum, and an average value of a total value of the plurality of regions.

Third Embodiment

In this embodiment, a primary transfer bias is controlled based on the overlapping detection results explained in the first embodiment. Primary transfer is where the primary transfer roller 2 transfers a toner image of the photosensitive member 101 to the intermediate transfer belt 6 by applying a primary transfer bias that is of an opposite polarity of a toner. At this time, transfer efficiency of a location where two colors or more overlap normally deteriorates when compared to a transfer efficiency of one color. This occurs because, due toner that is previously transferred to the intermediate transfer belt 6, a transfer gap occurs between the intermediate transfer belt 6 and newly transferred toner, and an electric field that acts on the newly transferred toner becomes weaker. Therefore, in this case, it is necessary to maintain transfer efficiency by controlling the primary transfer bias.

Figure 7:
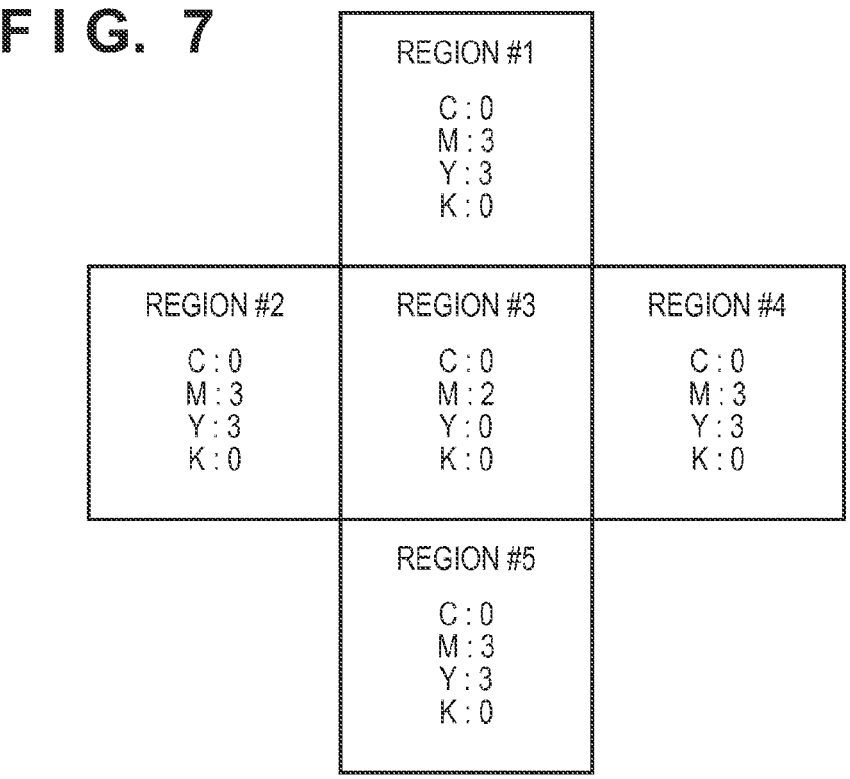
FIG. 7 is an explanatory view of primary transfer bias control according to an embodiment.

For example, as was explained in the processing in the first embodiment, the data shown in FIG. 7 is assumed to be stored in the page memory 212. The region #3 of FIG. 7 is surrounded by the regions #1, #2, #4 and #5, and other than in the region #3, an overlapping of toner image is included. In this case, there is a possibility that transfer efficiency of the region #3 is reduced. As explained above, a decline in transfer efficiency occurs more when a degree of overlapping toner of a predetermined adjacent region (the regions #1, #2, #4, and #5 in FIG. 7) is higher than a degree of overlapping toner of a target region (the region #3 in FIG. 7). This state is converted into a numeric value, and a primary transfer bias is changed according to the size of the numeric value. More specifically, from a value that represents an area of a toner of each color of an adjacent region, a value that represents an area of a toner of each color of a transfer target region is subtracted, and the sum of the values are regarded as a gap value G for a gap with the periphery area. Also, the primary transfer bias is controlled having made a value that is the sum of all gap values G for all adjacent regions to be a gap intensity GI.

Figure 8:
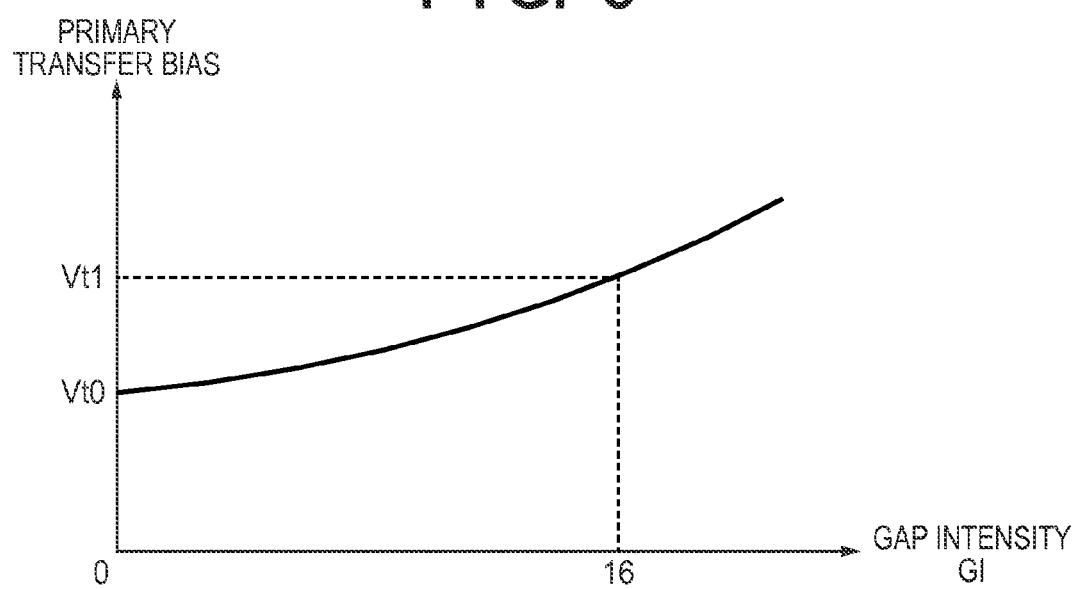
FIG. 8 is an explanatory view of a primary transfer bias control according to an embodiment.

For example, in FIG. 7, for the region #1 and the region #3, the difference of magenta is one, and the difference of yellow is 3, and therefore when summed up, the gap value G (#1) for between the region #1 and the region #4=1+3=4. Similarly, the gap values G(#2), G(#4) and G(#5) for gaps of the regions #2, #4, #5 with the region #3 are 4. Accordingly, the total value that is the gap intensity GI is 16. As shown in FIG. 8, based on information showing a relationship between the primary transfer bias and the gap intensity GI that is stored in advance in the image forming apparatus, a primary transfer bias Vt1 for when the gap intensity GI is 16 is selected. Note, in the case of a gap intensity GI being a negative value, since an overlap of a toner of a transfer target region is higher than surrounding overlap, the transfer bias is made to be Vt0. Also, in the case that there is no toner for the transfer target region, control such that a transfer bias is not applied, may be added.

Note, selecting a primary transfer bias of a toner image of a color is performed by calculating the gap intensity based on values of that color and the color of the toner image transferred prior to that color. In other words, the primary transfer bias is determined for the primary transfer roller 2Y, calculating the gap intensity GI only on yellow toner. Also, for the primary transfer roller 2M, a gap intensity GI is calculated from toner of yellow and magenta to decide the primary transfer bias. Additionally, for the primary transfer roller 2C, a gap intensity GI is calculated from toner of yellow, magenta, and cyan to decide the primary transfer bias. Additionally, for the primary transfer roller 2K, a gap intensity GI is calculated from toner of yellow, magenta, cyan and black to decide the primary transfer bias.

In this way, control can be performed to an optimal primary transfer bias from a state of an overlap of a toner of a region that is peripheral to the region that is to be transferred.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed comput-ing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-025924, filed Feb. 13, 2014, which is hereby incorporated by reference herein in its entirety.

What is claimed is:

1. An image forming apparatus for forming an image on a recording material by applying a plurality of color materials to the recording material in accordance with an image forming condition, the apparatus comprising:
    a determination unit configured to determine, for each first region of a first size, first values each relating to a surface area colored by a respective color material caused to adhere to a recording material based on converted data that are converted from image data corresponding to each image formed by the plurality of color materials, wherein the first region includes a plurality of pixels;
    a detection unit configured to detect an overlap of color materials for a second region of a second size larger than the first size based on the first values of a plurality of first regions included in the second region; and
    a control unit configured to control the image forming condition by which the plurality of color materials are formed into an image on the recording material, the image forming condition being controlled in accordance with the detected overlap of color materials.

2. The image forming apparatus according to claim 1, wherein a first value of a color material of a first region is a value based on a number of pixels for which the color material is caused to adhere in the first region.

3. The image forming apparatus according to claim 1, wherein a first value of a color material of a first region is a quantized value of a number of pixels for which the color material is caused to adhere in the first region.

4. The image forming apparatus according to claim 2, wherein
    the detection unit is further configured to detect the overlap of color materials in the second region based on second values each relating to a surface area colored by a respective color material caused to adhere in the second region, and
    a second value of a color material is a maximum value of the first values of the color material of the plurality of first regions included in the second region.

5. The image forming apparatus according to claim 4, further comprising a storage unit, wherein
    the detection unit is further configured to store the second values in the storage unit.

6. The image forming apparatus according to claim 1, further comprising a holding unit configured to hold data indicating whether or not each color material adheres for pixels of a predetermined number of lines in the main scanning direction, wherein
    a length in the sub-scanning direction corresponding to the predetermined number lines corresponds to a length in the sub-scanning direction of the first region.

7. The image forming apparatus according to claim 6, wherein the determination unit is further configured to, from image data corresponding to the predetermined number of lines in the main scanning direction, hold in the holding unit data indicating whether or not each color material adheres for the pixels of the predetermined number of lines, and based on the data that the holding unit holds, determine the first value of each color material for each first region included in the predetermined number of lines in the main scanning direction.

8. The image forming apparatus according to claim 4, wherein the detection unit is further configured to detect the overlap of color materials in the second region if at least two color materials adhere to the second region.

9. The image forming apparatus according to claim 4, wherein the detection unit is further configured to detect the overlap of color materials in the second region if the second value of at least one color material of the second region is greater than or equal to a threshold.

10. The image forming apparatus according to claim 4, wherein the detection unit is further configured to detect the overlap of color materials in the second region if the second values of at least two color materials are greater than or equal to a threshold.

11. The image forming apparatus according to claim 4, wherein the image forming condition that the control unit controls is for a fixing temperature at which color material, caused to adhere to a recording material, is fixed to the recording material.

12. The image forming apparatus according to claim 11, wherein the control unit is further configured to make a fixing temperature of the second region higher when a total value of the second values for each color material of the second region becomes larger.

13. The image forming apparatus according to claim 4, wherein the image forming condition that the control unit controls is for a transfer bias for when images formed by each color material are transferred, being overlapped on a recording material or an image carrier.

14. The image forming apparatus according to claim 13, wherein the control unit is further configured to determine a transfer bias of the second region for when transferring a predetermined color material, based on the second value of the predetermined color material of the second region, the second value of color material transferred prior to transferring the predetermined color material of the second region, the second value of the predetermined color material of a predetermined second region adjacent to the second region, and a second value of color material transferred prior to transferring the predetermined color material of the predetermined second region.

15. The image forming apparatus according to claim 1, wherein the determination unit is further configured to perform the determination with all of the converted data as a target.

16. The image forming apparatus according to claim 1, wherein the second region is a region comprising a plurality of dots.

17. The image forming apparatus according to claim 1, wherein the converted data are data after performing halftone process on the image data.

18. The image forming apparatus according to claim 1, wherein the detection unit is further configured to detect the overlap of color materials regarding an image formed on one side of the recording material using the plurality of color materials.

19. The image forming apparatus according to claim 1, wherein the detection unit is further configured to detect a number of overlapped color materials among the plurality of color materials in the second region based on the first values of the plurality of first regions included in the second region.

20. The image forming apparatus according to claim 1, wherein the detection unit is further configured to detect a color material overlapped with other color materials among the plurality of color materials in the second region based on the first values of the plurality of first regions included in the second region.

21. An image forming method for forming an image on a recording material by applying a plurality of color materials to the recording material in accordance with an image forming condition, the method comprising:
   a determination step of determining, for each first region of a first size, first values each relating to a surface area colored by a respective color material caused to adhere to a recording material based on converted data that are converted from image data corresponding to each image formed by a plurality of color materials, wherein the first region includes a plurality of pixels;
   a detection step of detecting an overlap of color materials for a second region of a second size larger than the first size based on the first values of a plurality of first regions included in the second region; and
   a control step of controlling the image forming condition by which the plurality of color materials are formed into an image on the recording material, the image forming condition being controlled in accordance with the detected overlap of color materials.

22. An image forming apparatus for forming an image on a recording material by applying a plurality of color materials to the recording material in accordance with an image forming condition, the apparatus comprising:
   a determination unit configured to determine, for each first region of a first size, first values each relating to a surface area colored by a respective color material caused to adhere to a recording material based on converted data that are converted from image data corresponding to each image formed by the plurality of color materials, wherein the first region includes a plurality of pixels;
   a detection unit configured to detect an overlap of color materials for a second region of a second size larger than the first size based on the first values of a plurality of first regions included in the second region; and
   a control unit configured to control the image forming condition by which the plurality of color materials are formed into an image on the recording material, the image forming condition being controlled in accordance with detected overlap of color materials,
   wherein the determination unit is further configured to perform the determination with all of the image data as a target.

23. An image forming method for forming an image on a recording material by applying a plurality of color materials to the recording material in accordance with an image forming condition, the method comprising:
   a determination step determining, for each first region of a first size, first values each relating to a surface area colored by a respective color material caused to adhere to a recording material based on converted data that are converted from image data corresponding to each image formed by a plurality of color materials, wherein the first region includes a plurality of pixels;
   a detection step of detecting an overlap of color materials for a second region of a second size larger than the first size based on the first values of a plurality of first regions included in the second region; and a control step of controlling the image forming condition by which the plurality of color materials are formed into an image on the recording material, the image forming condition being controlled in accordance with the detected overlap of color materials, wherein in the determination step, the determination is performed with all of the image data as a target.

\* \* \* \* \*